Oct. 16, 1934.                A. J. HERSAM                1,976,991
                    TUBE FEEDING AND STRIPPING DEVICE
                         Filed April 20, 1932            3 Sheets-Sheet 2
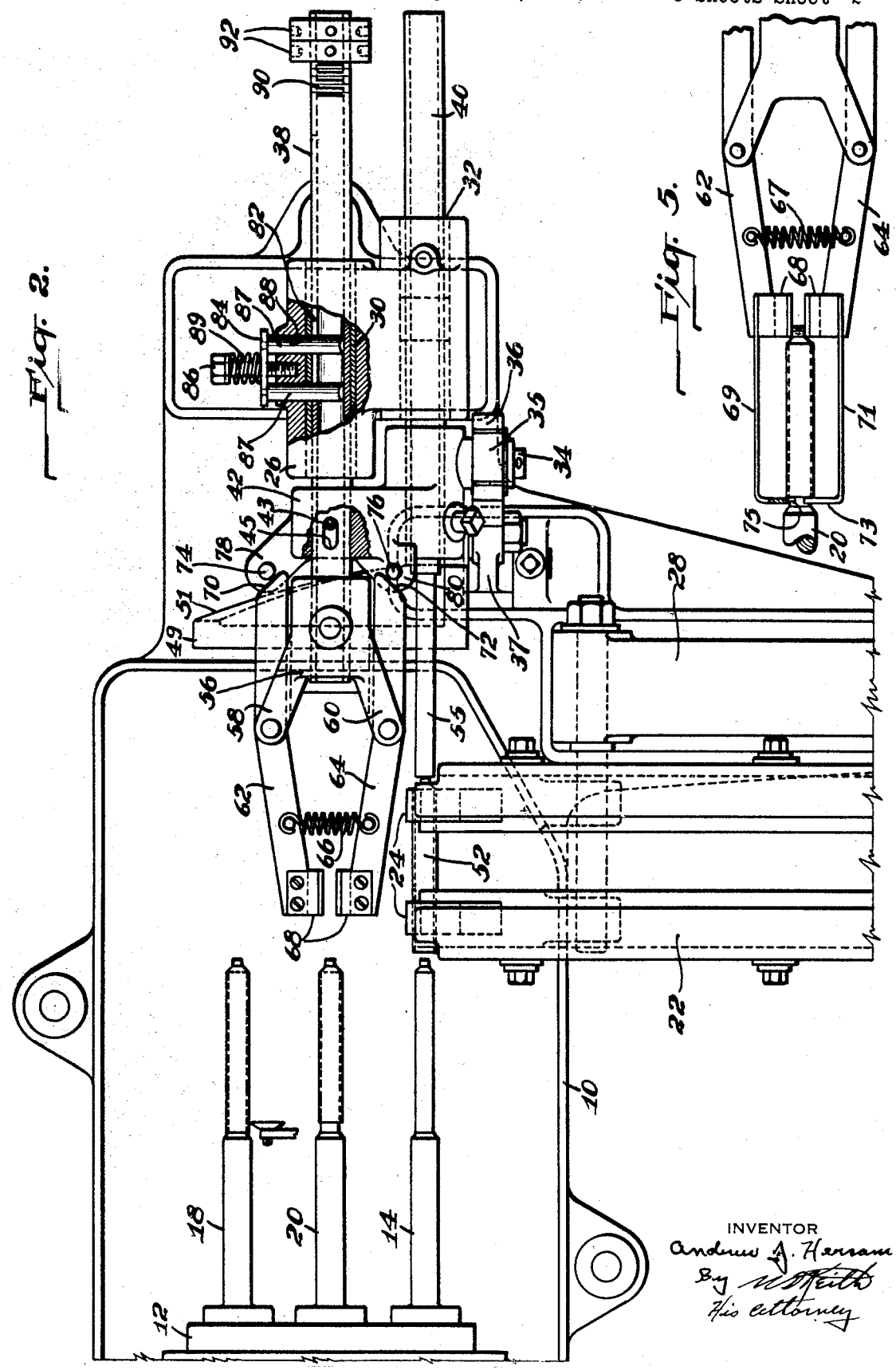
INVENTOR
Andrew J. Hersam
By W. T. Keith
His Attorney Oct. 16, 1934.   A. J. HERSAM   1,976,991
TUBE FEEDING AND STRIPPING DEVICE
Filed April 20, 1932   3 Sheets-Sheet 3
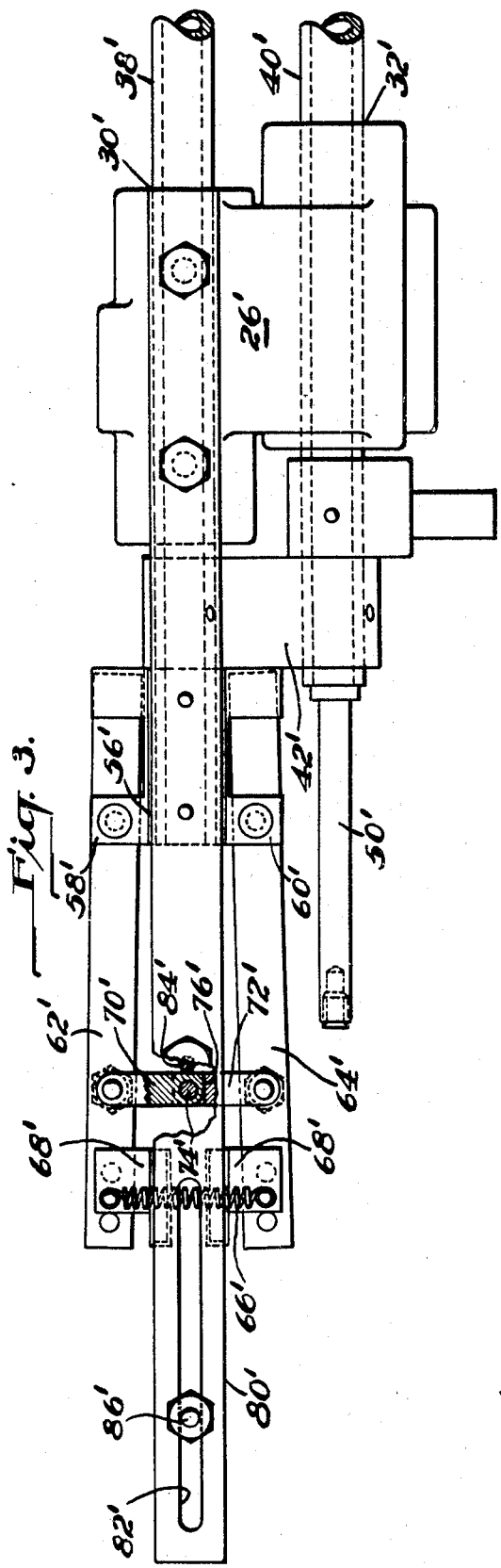
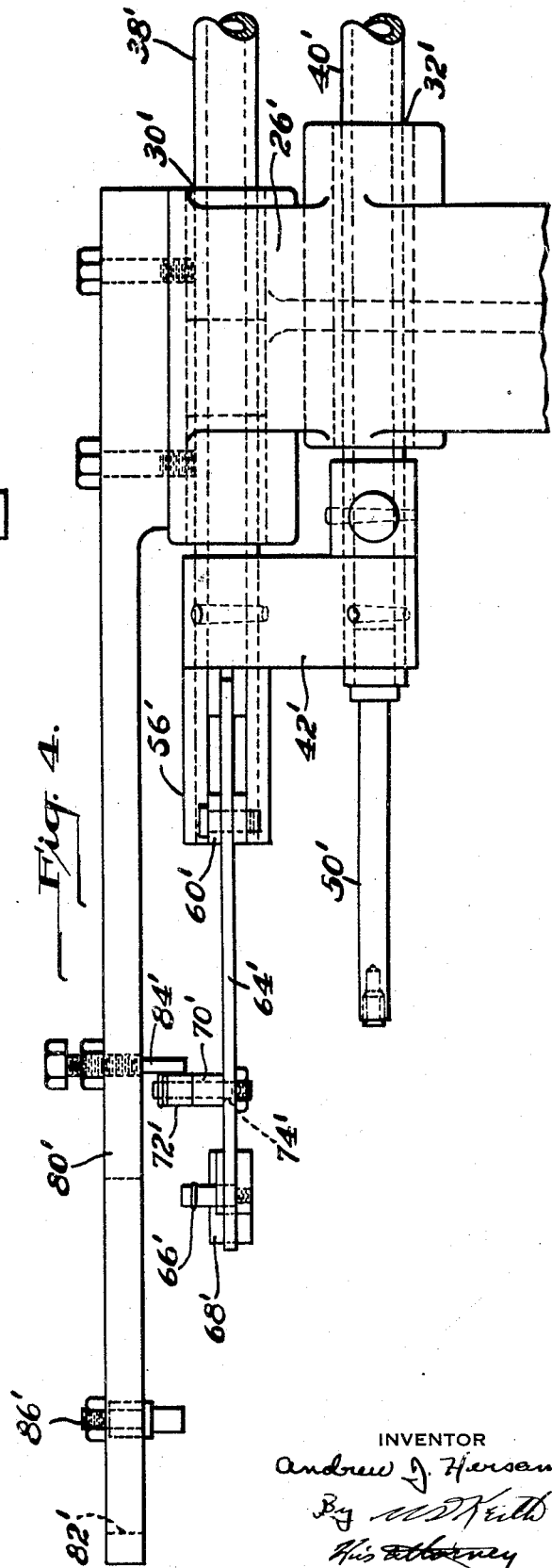
INVENTOR
Andrew J. Hersam
By W. D. Keith
His Attorney Patented Oct. 16, 1934

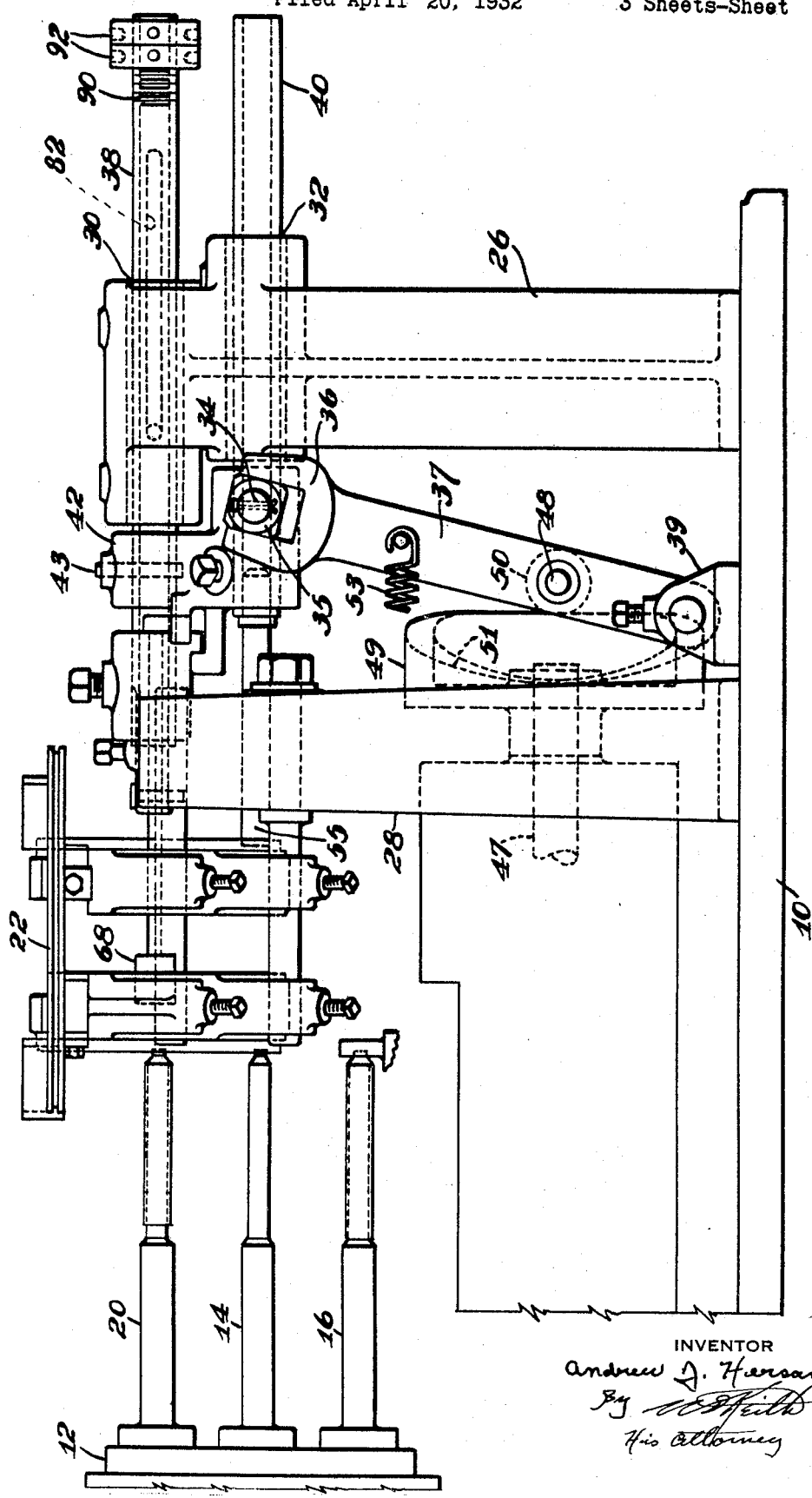

1,976,991

UNITED STATES PATENT OFFICE 1,976,991

TUBE FEEDING AND STRIPPING DEVICE

Andrew J. Hersam, West New York, N. J., assignor to Aluminum Company of America, Pittsburgh, Pa., a corporation of Pennsylvania Application April 20, 1932, Serial No. 606,349

15 Claims. (Cl. 29—38)

The improved feeding and stripping device comprising the present invention is primarily adapted for use in connection with collapsible tube trimming and threading machines, although the principles of the invention are capable of use in connection with capping or base coating machines, or in fact with any tube treating machine in which preformed collapsible tubes are applied to and removed from a mandrel.

Heretofore, in the manufacture of collapsible tubes, whether in connection with the trimming, threading, or capping of the tubes, it has been customary to manually or mechanically feed the tubes to be treated onto the mandrels of a revolvable turret and, after treating the tubes on the mandrels, to manually or pneumatically remove the tubes from the respective mandrels to which they have been applied. Where manual operations have been resorted to, either in applying the tubes to the mandrel or in removing the tubes therefrom, the extreme delicacy of the tubes greatly enhances the possibility of their becoming crushed or otherwise deformed. Where pneumatic operations have been employed in blowing the tubes from their respective mandrels, the same danger of crushing or otherwise spoiling the tubes is attendant. Because of the irregularity in suddenly and forcibly ejecting the tubes from the mandrels into a receptacle provided for the same, the tubes may become damaged colliding with each other or with the receptacle into which they are ejected. Also, certain tubes have a tendency to adhere to the mandrels and thus require for their removal a higher degree of internal pressure than the walls of the tube will withstand. Accordingly, the walls of such tubes become ruptured and it is necessary to stop the operation of the machine and manually strip the defective tube from its respective mandrel. Thus the percentage of spoilage involved by the pneumatic method of removing the tubes from the mandrels is unduly high.

The present invention is designed to overcome the limitations that are attendant upon machines of this nature which require for their operation either manual or pneumatic means for handling tubes. Accordingly, the present invention contemplates the provision of a machine of the turret mounted mandrel type, in which the tubes are uniformly and mechanically applied to the mandrels of the turret and in which, after being treated by the machine in the desired manner, whether the machine be a trimming, threading, or capping machine, the tubes are uniformly removed from the mandrel without danger of being injured.

Other objects and advantages of the invention, not at this time particularly enumerated, will become evident as the nature of the invention is better understood, and certain embodiments of the same consist in the novel construction, combination, and arrangement of parts shown in the accompanying drawings forming a part of this specification. In the drawings;

Fig. 1 is a side elevation of a trimming machine embodying the novel feeding and stripping device comprising the present invention.

Fig. 2 is a top plan view of the device shown in Fig. 1.

Fig. 3 is an enlarged, detailed top plan view of a modified form of tube feeding and stripping device.

Fig. 4 is a side elevation of the tube feeding and stripping device shown in Fig. 3.

Fig. 5 is a fragmentary top plan view showing a further modified form of tube stripping device.

In all of the above described views like characters of reference are employed to designate like parts throughout.

Referring now to Figs. 1 and 2, wherein one embodiment of the invention is shown, the invention is disclosed as being incorporated with a tube trimming and threading machine the principles of which are of a well known character. The device involves in its general organization a base 10, which base forms the supporting structure for both the trimming and threading machine and for the improved feeding and stripping mechanism. The machine is provided with a rotary mandrel-carrying turret 12 which is designed to have a step-by-step rotation and which carries four tube-holding mandrels 14, 16, 18 and 20. Each mandrel is independently rotatable about a horizontal axis and both the turret 12 and mandrels 14, 16, 18 and 20 are driven, as is usual, by suitable actuating gears (not shown).

In the operation of the threading and trimming machine, each mandrel is capable of assuming any one of four positions. In the position of the mandrel 14 the collapsible tubes are placed upon the respective mandrels; in the position of the mandrel 16 the necks of the tubes are trimmed and threaded; at the third position, which is that of the mandrel 18, the open ends of the tubes are cut to a uniform length; and at the fourth position, which is the position of the mandrel 20, the tubes are mechanically removed from the mandrels.

For conveying the preformed collapsible tubes into position to be applied to the mandrels, a suitable feed chute 22 is provided with a limit stop device 24 for aligning consecutive tubes with the various mandrels at the position indicated by mandrel 14. This chute 22 is secured to a standard 28 mounted upon the base 10. The chute 22 is conventional in its design and no claim is made in this application to any novelty in connection therewith, the novelty residing rather in the construction and combination of parts now to be more fully described.

Secured to the base 10 is a stationary support 26. Slidable in guides or bearings 30 and 32 in the support 26 are a pair of hollow shafts 38 and 40, respectively. Rigidly secured to the shaft 40 is a connecting head 42 which serves to connect the two shafts 38 and 40 together. The head 42 has affixed thereto a pin 43, which pin extends through a slot 45 in the shaft 38 to permit limited movement of the head 42 with respect to this latter shaft. The head 42 is provided with a second pin 34 having a square collar 35 rotatably mounted thereon, the opposite sides of which are straddled or embraced by the bifurcated end 36 of a lever 37. The lower end of the lever 37 is pivoted in a bracket 39 secured to the base 10 of the machine.

Designated at 47 is a drive shaft which is driven from any suitable source of power. Secured to this drive shaft is a cam member 49 having formed therein a cam surface 51. The lever 37 carries intermediate its ends a stud 48 having an anti-friction roller 50 mounted thereon and bearing against the cam surface 51. The roller 50 is normally held against the cam surface 51 by means of a tension spring 53 connected to the lever 37 and a stationary part of the machine. The cam surface 51 is of such contour as to cause intermittent reciprocation of the lever 37 on its pivot. Thus it will be seen that, as the shaft 47 rotates, the head 42 connected to the shafts 38 and 40 is caused to reciprocate horizontally toward and away from the mandrel-carrying turret 12.

As above described, the chute 22 is adapted to receive the preformed collapsible tubes and to successively align each tube for application on the tube receiving mandrels. In Fig. 2 the mandrel 14 is shown as being in position for receiving a tube 52 contained in the chute 22. The shaft 40 carries at one end thereof a tube-engaging plunger 55, the end of which is adapted to engage the neck of the tube 52 and force the tube onto the mandrel 14 when the carriage, which includes the shafts 38 and 40 and the head 42, is moved toward the turret 12.

In accordance with the principles of the present invention, movement of the carriage in a direction away from the turret 12 serves to cause stripping of a finished tube, from the mandrel 20. Toward this end, the shaft 38 carries a yoke 56 having ears 58 and 60 formed thereon, to which ears are pivoted intermediate their lengths a pair of arms 62 and 64 respectively. A tension spring 66 is connected to the arms 62 and 64 and serves to normally urge the forward ends of these arms together. Carried by the arms 62 and 64 are a pair of replaceable tube-engaging jaws 68 adapted to engage the collapsible body of the tube to remove the same from the mandrel 20. The arms 62 and 64 extend rearwardly of the yoke 56 and terminate adjacent the rear of the same. The rear ends of these arms are provided with cam surfaces 70 and 72, which surfaces are adapted to be engaged by pins 74 and 76 carried on ears 78 and 80 respectively, formed on the head 42. The slot 45, in which reciprocates the pin 43, carried by the head 42, is of such length that upon initial movement of the head 42 toward the turret 12 the pins 74 and 76 will engage the respective cam surfaces 70 and 72 and force the rear ends of the arms 62 and 64 towards each other to spread the tube-engaging jaws apart. Continued movement of the head 42 in a direction toward the turret 12 will cause the pin 43 to engage the end of the slot 45 and move the shaft 38 together with the yoke 56 and the jaw-carrying arms 62 and 64 in the same direction. Thus upon such continued movement, the jaws 68 are caused to straddle and overlie the body of the tube on the mandrel 20.

The pin and slot connection 43, 45 between the head 42 and shaft 38 permits a certain amount of lost motion to exist between these two parts. In order that sufficient resistance may be offered to the movement of the shaft 38 to cause the jaws 68 to open to receive the tube on the mandrel 20, the shaft 38 is provided with a slot 82 in the wall thereof. A cap screw 86 extends into the support 26 and slidably receives thereon a plate 84 through which the cap screw extends. A pair of pins 87 are carried by the plate and these pins extend through apertures 88 in the wall of the support 26 and bear against the inner wall of the hollow shaft 38. A coil spring 89 is disposed between the head of the cap screw 86 and the plate 84 to normally urge the plate away from the same and cause the pins 87 to bear frictionally on the inner wall of the shaft 38.

Movement of the carriage, which includes the shafts 38 and 40 and the head 42, away from the turret 12 serves to move the head 42 rearwardly so that the pin 43 engages the rear end of the slot 45. This limited movement of the head 42 with respect to the yoke 56 causes the pins 74 and 76 to move out of contact with the cam surfaces 70 and 72 and release the arms 62 and 64 thereby permitting the jaws 68 to close on the collapsible wall of the tube. Further movement of the head away from the turret 12 causes the yoke 56 to be moved rearwardly, thus stripping the tube from the mandrel 20. The tension of the spring 66, while sufficient to cause stripping of the tube from the mandrel 20, is not so great as to cause damage to the tube. The next movement of the carriage toward the turret 12 will cause the jaws 68 to be again opened, in the manner previously described, to release the tube preparatory to moving of the jaws over the next succeeding tube to be stripped.

The rear end of the shaft 38 is threaded as at 90 and a pair of adjustable nuts 92 are received on this threaded end of the shaft to provide an adjustable stop for limiting the travel of the carriage.

Referring now to Figs. 3 and 4, a modified form of the tube stripping mechanism is disclosed. The mounting of the mechanism is substantially the same as the mounting in the mechanism shown in Figs. 1 and 2; the support for the actuating shafts 38' and 40' being designated at 26' and the bearings for these two shafts being shown at 30' and 32'. The connecting head 42' is similar to the head 42 but is rigidly connected to the shafts 38' and 40' to cause these shafts to move in unison. Secured in any suitable manner to the shaft 38' is a yoke 56' having ears 58' and 60', to which ears are pivoted the ends of a pair of jaw-carrying arms 62' and 64'. Replaceable jaws 68' for gripping the tube on the mandrel 20 occupy opposed positions on the forward ends of the arms 62' and 64'. The outer ends of the arms 62' and 64' are normally urged toward each other by means of a coil spring 66', the opposite ends of which are secured to these arms.

Pivoted to the arms 62' and 64' are a pair of links 70' and 72'. These links are hinged together at their inner ends as at 74'. The inner ends of the links 70' and 72' present opposed surfaces 76' adapted to abut when the links are in extended aligned position to prevent collapsing of the links in one direction, while at the same time permitting the links to collapse in the opposite direction. The links 70' and 72' provide, in effect, a collapsible toggle connection for spreading the jaws 68' and for permitting these jaws to collapse upon a tube carried by the mandrel 20. Secured to any suitable stationary part of the machine such as the support 26', is an elongated bracket 80' having a longitudinal slot 82' formed in the same. The bracket 80' is provided with a limit stop 84' on one side of the toggle link connection 70', 72' and a second stop 86' is adjustably secured in the slot 82' on the other side of the toggle link connection.

In the operation of this form of device, rearward movement of the carriage, which includes the shafts 38' and 40' and the connecting head 42', will cause the links 70' and 72' to engage the limit stop 84' and force these links into alignment to spread the arms 62' and 64' apart and permit the jaws 68' to open. When the carriage moves in the opposite direction towards the mandrel carrying turret, these jaws are advanced upon the tube on the mandrel 20. When the links 70' and 72' strike the adjustable stop 86' the toggle connection is collapsed and the jaws closed upon the body of the tube carried on the mandrel. At the same time that the carriage is advanced, a member 50' carried by the shaft 40' removes a tube from the chute and places the same on the mandrel 14 in the manner described in connection with the preferred form of the invention.

Rearward movement of the carriage away from the mandrel-carrying turret will withdraw the tube from the mandrel 20 and upon engagement of the toggle links 70' and 72' with the stop 84' the tube thus removed will be released. The provision of the adjustable stop 86' makes it possible to accommodate different lengths of collapsible tubes. In order that the jaws 68' will close effectively upon the body of the tube, the stop 86' may be moved rearwardly to effect collapsing of the jaws at a point not so far advanced on the mandrel 20. Adjustment of this stop in the other direction will cause delayed collapsing of the jaws 68' so that these jaws engage the tube at a point further advanced upon the mandrel.

In Fig. 5 there is disclosed a further modification of tube-engaging device. In this form of the invention the jaw-carrying arms 62 and 64 and the jaws 68 remain substantially the same as the corresponding elements in the preferred form of the invention. The arms 62 and 64 are normally urged toward each other by means of a coil spring 67 similar to the coil spring 66 but of lighter construction. Secured to the arms 62 and 64 in any suitable manner are a pair of spring fingers 69 and 71 which fingers at their outer ends are provided with inturned portions 73 having grooved recesses 75 formed thereon adapted to engage the mandrel 20 beyond the trimmed end of the tube. The forward portion of the tube is adapted to be received in the jaws 68 and the tension of the spring 67 is merely sufficient to support the tube. As the carriage is moved away from the mandrel, the tube is withdrawn from the mandrel and held by the jaws 68. In this form of the invention there is less danger of collapsing the tube as the force applied by the jaws 68 need only be sufficient to give the required support, the actual stripping of the tube from its mandrel being accomplished by the end-engaging fingers 73.

The invention is not to be limited to the exact arrangement of parts shown in the accompanying drawings and described in this specification, as various changes in the details of construction may be resorted to without departing from its spirit. Only in so far as the invention has particularly been pointed out in the accompanying claims is the same to be limited.

What I claim is:

1. In a machine for finishing preformed collapsible tubes, the combination with a tube holding mandrel, of a carriage movable toward and away from said mandrel, instrumentalities for aligning a tube to be finished with said mandrel, a tube engaging element carried by said carriage adapted upon movement of said carriage toward said mandrel to apply the tube to the same, and a second tube engaging element carried by said carriage adapted upon movement of the carriage away from said mandrel to forcibly remove said tube from the same.

2. In a machine for finishing preformed collapsible tubes, the combination with a bodily movable tube holding mandrel capable of assuming a plurality of positions, of a carriage movable toward and away from said mandrel, means for aligning a tube to be finished with said mandrel when the latter is in one position, a tube engaging element carried by said carriage adapted on movement of said carriage toward said mandrel to apply the tube to the same, a second tube engaging element carried by said carriage adapted to engage the body of said tube when said mandrel is in another position and forcibly remove the tube from said mandrel upon movement of said carriage away from said mandrel.

3. In a machine for finishing preformed collapsible tubes, in combination with a revolvable turret having tube carrying mandrels carried thereby and a chute terminating adjacent the path of rotation of said mandrels and adapted to contain the preformed tubes to be finished, of a carriage movable toward and away from said turret, means movable with said carriage for forcing a tube contained in said chute onto a mandrel when said carriage is moved toward said turret, and means movable with said carriage for removing a tube from another of said mandrels upon the next succeeding movement of the carriage away from said turret.

4. In a tube stripping machine, the combination with a mandrel and a tube carried thereby, of a pair of tube engaging jaws movable towards and away from said mandrel, means normally urging said jaws into tube engaging position, means independent of the tube adapted upon movement of said jaws toward said mandrel to open the jaws sufficiently to clear the tube and upon movement of said jaws away from said mandrel to permit said jaws to close upon the tube carried by said mandrel.

5. In a tube stripping mechanism, the combination with a tube carrying mandrel, of a yoke movable toward and away from said mandrel, a pair of arms pivotally carried by said yoke and having opposed tube engaging jaws carried thereon, a head having relative movement with respect to said yoke and adapted to move said yoke toward and away from said mandrel, means on said head for engaging said arms to move said jaws to open position upon movement of said head towards said mandrel, said means being movable out of engagement with said arms to permit said jaws to close upon the mandrel upon movement of said head away from said mandrel.

6. In a tube stripping mechanism, the combination with a tube carrying mandrel, of a yoke movable toward and away from said mandrel, a pair of arms pivotally carried by said yoke and having tube engaging jaws carried thereon, a head having relative movement with respect to said yoke adapted to move said yoke toward and away from said mandrel, there being cam surfaces on said arms, and pins on said head adapted to engage said cam surfaces to move said arms and operate said jaws when said yoke is moved toward and away from said mandrel.

7. In a tube stripping mechanism, the combination with a tube carrying mandrel of a yoke movable toward and away from said mandrel, a pair of arms pivotally carried by said yoke and having tube carrying jaws carried thereon, a head having relative movement with respect to said yoke and adapted to move said yoke toward and away from said mandrel, means for restricting relative movement between said yoke and head, there being cam surfaces on said arms and pins on said head adapted to engage said cam surfaces to move said arms and operate said jaws upon movement of said head toward and away from said mandrel.

8. In a tube stripping mechanism, the combination with a tube carrying mandrel, of a yoke movable toward and away from said mandrel, a pair of arms having adjacent ends pivoted to said yoke, the outer ends of said arms carrying opposed tube engaging jaws, means normally urging the outer ends of said arms towards each other, a link having one end thereof pivoted to each arm intermediate its length, the other ends of said links being pivoted together whereby said links are collapsible upon movement of said arms towards each other, means for maintaining said links in extended position, and a pair of stops disposed on opposite sides of said links adapted to be engaged by one of said links to extend or collapse said links.

9. In a tube stripping mechanism, the combination with a tube carrying mandrel, of a yoke movable toward and away from said mandrel, a pair of arms having adjacent ends pivoted to said yoke, the outer ends of said arms carrying opposed tube engaging jaws, means normally urging the outer ends of said arms towards each other, a link having one end thereof pivoted to each arm intermediate its length, the other ends of said links being pivoted together whereby said links are collapsible upon movement of said arms towards each other, means for maintaining said links in extended position, and a pair of stops disposed on opposite sides of said links adapted to be engaged by one of said links to extend or collapse said links, one of said stops being adjustable toward and away from said links.

10. In a tube stripping mechanism, a mandrel and a tube carried thereby, tube engaging jaws movable toward and away from said tube carrying mandrel, means normally urging said jaws into tube engaging position, and means responsive to the movement of said jaws toward and away from said mandrel adapted to open the jaws sufficiently to clear the tube and to permit the jaws to close upon the tube at the end of the movement toward said mandrel.

11. In a tube stripping mechanism, a tube carrying mandrel, a yoke movable toward and away from said mandrel, arms pivotally carried by said yoke and having tube engaging jaws, a head mounted for limited movement relative to said yoke and adapted to move said yoke toward and away from said mandrel, means on said head for engaging said arms to move said jaws to open position upon movement of said head towards said mandrel, said means being movable out of engagement with said arms to permit said jaws to close upon the mandrel upon movement of said head away from said mandrel.

12. In a tube stripping mechanism, a tube carrying mandrel, a yoke movable toward and away from said mandrel, arms pivotally carried by said yoke and having tube engaging jaws, a head mounted for limited movement relative to said yoke and adapted to move said yoke toward and away from said mandrel, frictional means for restraining such relative movement between said head and yoke, means on said head for engaging said arms to move said jaws to open position upon movement of said head toward said mandrel and relative to said yoke, said means being movable out of engagement with said arms to permit said jaws to close upon the mandrel upon movement of said head away from said mandrel and relative to said yoke.

13. In a tube stripping mechanism, the combination with a mandrel and a tube carried thereby, of a yoke movable toward and away from said mandrel, a pair of arms pivotally carried by said yoke and having opposed tube engaging jaws carried thereon, a pair of spring fingers secured to said pivotally mounted arms, said fingers having inturned ends and grooved recesses adapted to engage said mandrel, a head having relative movement with respect to said yoke and adapted to move said yoke towards and away from said mandrel, means on said head for engaging said arms to move said jaws and spring fingers to open position upon movement of said head towards said mandrel, said means being movable out of engagement with said arms to permit said jaws to close upon the tube and said spring fingers to close upon said mandrel upon movement of said head away from said mandrel.

14. In a machine for operating upon thin collapsible tubes, a mandrel, and means for dismounting a tube from the mandrel, said means including a slide, means for initially resisting movement of said slide, a member adapted to engage the surface of the tube, and means for operatively connecting the slide and the member, said last-mentioned means comprising means for controlling movement of the member in a direction to engage the tube surface and for moving the slide axially of the mandrel against the resistance of the slide movement-resisting means.

15. In a machine for operating upon thin metal collapsible tubes, a mandrel adapted to support a tube, means including a member for engaging the surface of a tube on the mandrel, and means for moving the member axially of the mandrel to dismount the tube therefrom comprising a slide, means for guiding the slide in a direction axially of the mandrel, means for normally resisting movement of the slide, and means for operatively connecting the slide to the member whereby the member is first brought into engagement with the tube surface, and the slide, member and tube are then moved as a unit when the member engages the tube surface with sufficient friction, and the resistance of the resisting means is overcome.

ANDREW J. HERSAM.